United States Patent [19]

Liao

[11] 4,201,667

[45] May 6, 1980

[54] PROCESS FOR REMOVING ARSENIC FROM AQUEOUS MEDIUMS

[75] Inventor: Hsiang P. Liao, Princeton, N.J.

[73] Assignee: FMC Corporation, Philadelphia, Pa.

[21] Appl. No.: 10,434

[22] Filed: Feb. 9, 1979

[51] Int. Cl.$^2$ .............................................. C02C 5/04
[52] U.S. Cl. .................................................... 210/50
[58] Field of Search ....................... 210/42 R, 50–53, 210/62

[56] References Cited

U.S. PATENT DOCUMENTS

| 3,766,036 | 10/1973 | McKaveney | 210/42 R |
| 4,118,243 | 10/1978 | Sandesara | 210/50 X |
| 4,142,912 | 3/1979 | Young | 210/42 R |

FOREIGN PATENT DOCUMENTS 559906 7/1974 U.S.S.R. ...................................... 210/50

*Primary Examiner*—Thomas G. Wyse
*Attorney, Agent, or Firm*—Eugene G. Horsky; Frank Ianno; Pauline Newman

[57] ABSTRACT

A process for removing arsenic from aqueous mediums by adding, in the presence of phosphorus, sufficient calcium hydroxide to adjust the aqueous medium to a pH of from about 7.0 to 11.5, whereby precipitates of both arsenic and phosphorus are formed and are subsequently separated from the aqueous medium. As a secondary treatment, calcium salts of arsenic and phosphorus in oxidation states lower than +5, and thus dissolved in the aqueous medium are oxidized, as by the addition of chlorine or hypochloride to such medium, and thereby converted to more insoluble forms which are separated from the aqueous medium as precipitates.

7 Claims, No Drawings

PROCESS FOR REMOVING ARSENIC FROM AQUEOUS MEDIUMS

The present invention is directed to an improved process for removing arsenic from aqueous mediums.

Known in the art are various physical and chemical procedures for removing arsenic from treatment or waste waters for recovery and/or as a pollution abatement measure. Separation can be achieved, for instance, by arsenic adsorption on amorphous aluminum hydroxide. As discussed in the Journal of Colloid and Interface Science, Volume 54, No. 3, Pages 391–399, March 1976, by this means a plateau of 0.3 ppm arsenic in the treated effluent can be attained, but further reduction of the arsenic content is difficult.

It is also known that by precipitation with calcium oxide and ferric chloride, the content of arsenic (valence states III or V) in waste water can be decreased. Using this procedure, the arsenic concentration of waste water has been reduced from 1000 ppm to 5 ppm, as described by J. Hollo et al in Polytech. Chem. Eng. (Budapest) 12(3), pages 283–292, 1968.

Removal of arsenic from water wastes with slaked lime or bleaching solution is well known. Going beyond such teachings, Japanese patent 20952 (1974), Sumitomo Chemical Co., Ltd., describes the use of both slaked lime and bleaching solution, together with magnesium chloride, for removing arsenic (valence state III) from waste water. As more fully described in this Japanese patent, a waste water containing 2490 ppm arsenic (III) was treated with bleaching solution and then with slaked lime and magnesium chloride and was stirred. Upon filtering the waste water to remove precipitates which had formed, the filtrate had an arsenic content of 3.07 ppm.

As effective as are these known procedures for removing arsenic from treatment and waste waters, there is yet room for improvement, particularly in the continuing efforts to abate pollution. Accordingly, a primary object of this invention is to provide an improved and more satisfactory process for treating aqueous, arsenic-containing mediums to effect the removal of arsenic therefrom.

Another object of this invention is an improved process for treating an aqueous, arsenic-containing medium which provides for the rapid removal of the major portion of arsenic contained therein, and also facilitates to minimize residual arsenic which may normally be present as water-soluble compounds.

A still further object of this invention is an improved process for removing arsenic from an aqueous medium, which process, by itself, renders the aqueous medium in condition for reuse or discharge as waste.

These and other objects of the invention are achieved by a process which comprises incorporating into an aqueous, arsenic-containing medium, and in the presence of phosphorus, sufficient calcium hydroxide ($Ca(OH)_2$) to adjust the aqueous medium to a pH of from 7.0 to 11.5, thereby causing both the arsenic and phosphorus to precipitate, and thereafter separating the precipitates from the aqueous medium. In accordance with the process of this invention residual concentrations of arsenic and phosphorus, which are in lower oxidation states and thus are normally present as water-soluble compounds, are minimized by the oxidation thereof with chlorine, preferably before the addition of the $Ca(OH)_2$, to more insoluble compounds which are separated as precipitates from the aqueous medium.

Used alone, calcium hydroxide exhibits poor arsenic removal efficiency, especially with aqueous mediums having an initial low concentration of arsenic. Thus, the process of this invention departs from procedures known in the art by having both calcium hydroxide and phosphorus in the aqueous medium undergoing treatment, and it is this presence of phosphorus which renders the process of this invention highly effective in the removal of arsenic.

The mechanism by which the phosphorus and calcium hydroxide provide for the removal of arsenic from the waste water is uncertain. This might occur by simple physical entrapment, but more likely through the formation of a coprecipitation complex. In treating a synthetic solution by the process of the present invention, such solution being formulated by adding arsenic trioxide ($As_2O_3$), dissolved in a small amount of 30% sodium hydroxide (NaOH), phosphorous trichloride ($PCl_3$), and phosphorus oxychloride ($POCl_3$) to distilled water, it is believed that the removal and phosphorus occurs through the formation of calcium arsenate ($Ca_3(AsO_4)_2$) and calcium phosphate ($Ca_3(PO_4)_2$), both of which are water-insoluble. From this conclusion, a possible reaction sequence is as follows:

$Ca_3(AsO_4)_2$ Formation

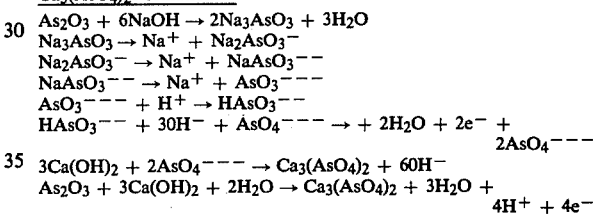

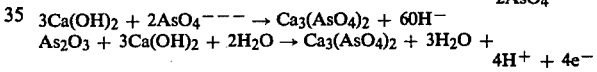

$Ca_3(PO_4)_2$ Formation

From $PCl_3$:

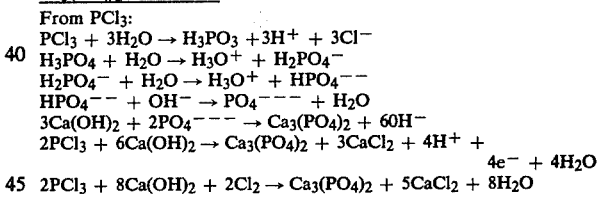

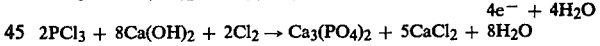

From $POCl_3$:

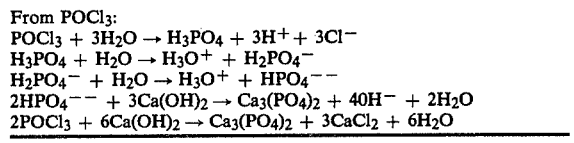

The process of the present invention is applicable for use in treating aqueous mediums into which phosphorus must be intentionally added to secure the efficient removal of arsenic. Of significance, while such addition of phosphorus enhances arsenic removal, no problems are encountered in removing substantially all of the phosphorous added to the aqueous medium undergoing treatment. When such phosphorus addition is necessary, the compounds added preferably contain phosphorus in a high oxidation state, perhaps phosphorus pentoxide ($P_2O_5$), so as to assure the desired rapid precipitation of both the arsenic and phosphorus.

The process of this invention is most admirably suited in treating aqueous mediums which normally contain both arsenic and phosphorus. For example, and for ease and simplicity, the process of this invention is hereafter described in the treatment of aqueous mediums simulating those as might be encountered during operation of a phosphorus trichloride (PCl$_3$) reactor, and synthtic and actual wash water provided during cleanout of such reactor. As phosphorus (P$_4$) feedstock to such reactor contains arsenic, the reactor cleanout wash water may have a concentration of from about 50 to 200 ppm arsenic and from about 200 to 600 ppm phosphorus.

Synthetic process and wash waters were prepared by reacting As$_2$O$_3$, PCl$_3$ and POCl$_3$ in distilled water. For example, a process vent stream, which may contain from about 1 ppm arsenic about 2000 ppm phosphorus, was prepared by dissolving 1.320 g As$_2$O$_3$ in 10 ml of distilled water containing 4.0 g NaOH, adding distilled water to provide 100 ml of solution, diluting 300 ml to 3000 ml by the further addition of distilled water, and introducing into the 3000 ml of solution 13.9 g POCl$_3$ and 59.0 g PCl$_3$. After stirring this mixture overnight, an analysis of the resulting synthetic solution indicated a concentration of 1.0 ppm arsenic and 1900 ppm phosphorus.

In arsenic analysis as referred to herein, inorganic arsenic is reduced to arsene (AsH$_3$) by zinc in an acid solution which produces hydrogen gas. The arsene is passed through a scrubber-absorber containing glass wool, impregnated with lead acetate which removes any sulfur, and glass beads to break up bubbles of arsene gas. The arsene gas bubbles are then passed through a solution of silver diethyldithiocarbonate in pyridine. Arsenic reacts with the silver salt, forming a soluble red complex which is measured photometrically.

To afford a further understanding and appreciation of the present inventions portions of actual and synthetic PCl$_3$ reactor wash and process waters, designated as SAMPLES 1–5, were treated at room temperature in accordance with the described process and the results of such treatment are set forth in TABLE I. Typical of the process is the treatment applied to SAMPLE 1, wherein 6.34 grams of Ca(OH)$_2$ was added to 200 ml of PCl$_3$ reactor wash water, resulting in a final pH of 11.4. The slurry was stirred for 30 minutes and was then filtered through a Whatman #1 fast filter paper, and the filtrate was analyzed.

As shown by the results in TABLE I, when sufficient Ca(OH)$_2$ is added to bring the pH of reactor wash and process water to about 11.5, from 97.7 to 99.7% of the arsenic and 95–97.7% of the phosphorus was removed by precipitation and filtration. Of significance is that the treatment of synthetic process vent water having an extremely low arsenic content, SAMPLE 5, resulted in removal of over 99% of both the arsenic and phosphorus contaminants.

To determine and illustrate the efficiency of the process of the present invention, SAMPLES 13–15 of synthetic process and wash water containing phosphorus but no arsenic, and SAMPLES 16–19 of synthetic water containing both arsenic and phosphorus were treated with Ca(OH)$_2$ in a manner as described above relative to SAMPLE 1. The analysis of the respective sample filtrates are shown in TABLE II and indicate clearly that the presence of phosphorus provides for the removal of significantly high amounts of arsenic from the process and wash water by the Ca(OH)$_2$ treatment.

In the practice of the process of the present invention, some variation in efficiency occurs as the pH of the aqueous medium is reduced by increased amounts of Ca(OH)$_2$. As shown in TABLE III, when reactor wash ater, containing 59 ppm arsenic and 2762 ppm phosphorus, is treated with Ca(OH)$_2$ to a pH of 7.0, removal 94% of both the contained arsenic and phosphorus was achieved. When treatment was continued to a pH of 9.0, the removal of arsenic and phosphorus was enhanced with arsenic removal being impressive. The difference between the results of treating reactor wash water to a pH of 9.0 and to a pH of 11.5 is slight and may not be statistically significant. Moreover, with the treatment of the reactor wash water to a pH of 9.0, neutralization of the filtrate before discharge can be eliminated, or at least reduced, without any substantial loss in efficiency.

As indicated in TABLE IV, when the reactor wash water is diluted to 11.6 ppm arsenic and 323 ppm phosphorus, Ca(OH)$_2$ treatment to a pH of 9.0 again appears to be as efficient as treatment to a pH of 11.5. Simulated process water, containing 1 ppm and 1900 ppm phosphorus, treated to a pH of 9.0 was not as effective as treatment to a pH of 11.5, as shown in TABLE V. Thus, the pH of the aqueous medium undergoing treatment may well be varied depending upon the final level of arsenic desired.

Practice of the described invention at temperatures below room temperature involves no significant loss in efficiency. As shown in TABLE VI, when reactor wash water was treated with Ca(OH)$_2$ to a pH of 9.0 at from 0°–5° C., the efficiency of arsenic and phosphorus removal was nearly identical to that realized at room temperature. Similarly, as indicated in TABLE VII, the treatment of simulated process water showed no loss in efficiency when carried out at from 0°–5° C.

Arsenic and phosphorus in waste water are generally present in both higher and lower oxidation states and it is known that calcium arsenate and calcium phosphate compounds in the higher oxidation state are more insoluble than corresponding compounds in lower states of oxidation. The presence of calcium salts of arsenic and phosphorus in oxidation states less than +5 is believed to at least partially account for the residual amounts found in the filtrates. Thus, in accordance with the present invention when it is desired to reduce arsenic and phosphorus levels below that provided by the Ca(OH)$_2$ treatment, the aqueous medium is also subjected to chlorine treatment, preferably prior to the addition of Ca(OH)$_2$, to thereby oxidize these dissolved salts to more insoluble forms.

The success of such secondary chlorine treatment is shown in TABLE VIII, in which are set forth the results achieved by adding sodium hypochlorite (NaOCl) to reactor wash water which was first treated with Ca(OH)$_2$. Apparently through such oxidation, the NaOCl treatment significantly reduced the concentrations of both arsenic and phosphorus in the Ca(OH)$_2$ treated wash water. This reaction does not occur rapidly, with the Ca(OH)$_2$ treated wash water being in contact with residual chloride for some 40 hours to achieve the maximum effect.

The use of the secondary chlorine treatment on simulated process vent water, which was first treated to a pH of 9.0 with Ca(OH)$_2$, has an even more marked effect on the final arsenic and phosphorus contents, as shown in TABLE IX. In this instance, the chlorine enhanced the removal of arsenic and phosphorus to the levels achieved in the treatment with Ca(OH)$_2$ to a pH of 11.5.

Attempts to oxidize arsenic and phosphorus salts having lower oxidation states through the addition of hydrogen peroxide (H$_2$O$_2$) provided for no significant effect, even when the solutions were allowed to stand for several days. Oxidation of such arsenic and phosphorus salts with ozone was also attempted and, as shown by TABLE X, provided only marginal effects.

Separation of the precipitate or sludge from the aqueous treated medium may be achieved, for example, by filtration, settling and decanting, and settling followed by filtration of the supernatant, as illustrated by the results with SAMPLES 28, 30, 31 and 34 set forth in TABLE XI. The presence of a polyelectrolyte settling aid enhances the settling characteristics of these sludges. More specifically, as shown in TABLE XII, SAMPLES 29, 32 and 33, the presence of only 8 ppm of HENCOFLOC 831.2, a medium anionic polyelectrolyte, manufactured by Hercules Incorporated, reduced suspended solids to a negligible level and improved arsenic removal to the level achieved by filtration. While the addition of the polyelectrolyte settling aid before settling increases the sludge volume, as indicated by the results achieved with SAMPLE 35, this effect can be eliminated by adding such agent only to the liquid layer after an initial settling period.

TABLE I

REMOVAL OF ARSENIC AND PHOSPHORUS FROM REACTOR WASH BY $Ca(OH)_2$ TREATMENT

| SAMPLE | FEED COMPOSITION | | $Ca(OH)_2$ ADDED WT. % | FINAL pH |
|---|---|---|---|---|
| | ARSENIC, ppm | PHOSPHORUS, ppm | | |
| 1 | 59.1 | 2762 | 3.2 | 11.4 |
| 2 | 59.1 | 2762 | 4.0 | 11.5 |
| 3 | 27.5 | 1625 | 2.4 | 11.6 |
| *4 | 81.0 | 1659 | 3.0 | 11.5 |
| *5 | 1.0 | 1900 | 4.5 | 11.6 |

| SAMPLE | FILTRATE COMPOSITION | | | |
|---|---|---|---|---|
| | ARSENIC | | PHOSPHORUS | |
| | ppm | % REMOVED | ppm | % REMOVED |
| 1 | 0.135 | 99.7 | 67.6 | 97.7 |
| 2 | 0.226 | 99.7 | 138.0 | 95.0 |
| 3 | 0.086 | 97.7 | 68.0 | 95.8 |
| *4 | 0.700 | 99.1 | 81.0 | 95.0 |
| *5 | <0.010 | >99.0 | 16.0 | 99.2 |

*Synthetic solution

TABLE II $Ca(OH)_2$ TREATMENT OF ARSENIC SOLUTIONS WITH AND WITHOUT PHOSPHORUS

| SAMPLE | FEED COMPOSITION | | $Ca(OH)_2$ TREATMENT TO pH |
|---|---|---|---|
| | ARSENIC, ppm | PHOSPHORUS, ppm | |
| 13 | 1.0 | 0 | 11.4 |
| 14 | 200 | 0 | 11.5 |
| 15 | 1400 | 0 | 11.7 |
| 16 | 1.0 | 1900 | 11.6 |
| 17 | 81.0 | 1659 | 11.5 |
| 18 | 150 | 300 | 11.6 |
| 19 | 1175 | 5700 | 11.3 |

| SAMPLE | FILTRATE COMPOSITIONS | | | |
|---|---|---|---|---|
| | ARSENIC | | PHOSPHORUS | |
| | ppm | % Removal | ppm | % REMOVAL |
| 13 | 00.73 | 27.0 | — | — |
| 14 | 22.30 | 89.0 | — | — |
| 15 | 170.00 | 88.0 | — | — |
| 16 | <0.01 | >99.0 | 57 | 97.0 |
| 17 | 0.70 | 99.1 | 81 | 95.0 |
| 18 | 1.00 | 99.4 | 196 | 70.0 |
| 19 | 1.20 | 99.9 | 64 | 98.8 |

TABLE III

TREATMENT OF $PCl_3$ REACTOR WASHOUT WITH $Ca(OH)_2$

| Feed | $Ca(OH)_2$ Treatment | | Treated Filtrate | | | |
|---|---|---|---|---|---|---|
| | $Ca(OH)_2$, Wt. % | pH | Arsenic | | Phosphorus | |
| | | | PPM | % Removal | PPM | % Removal |
| $PCl_3$ Reactor Washout As = 59 ppm P = 2762 ppm pH = 1.0 | 2.80 | 7.0 | 3.400 | 94.0 | 159 | 94.0 |
| | 3.00 | 8.0 | 0.300 | 99.5 | 110 | 96.1 |
| | 3.95 | 11.5 | 0.226 | 99.7 | 138 | 95.0 |

TABLE IV

TREATMENT OF DILUTED $PCl_3$ REACTOR WASHOUT WITH $Ca(OH)_2$

| Feed | $Ca(OH)_2$ Treatment | | Treated Filtrate | | | |
|---|---|---|---|---|---|---|
| | $Ca(OH)_2$, Wt. % | pH | Arsenic | | Phosphorus | |
| | | | PPM | % Removal | PPM | % Removal |
| Diluted $PCl_3$ Reactor Washout As = 11.6 ppm P = 354 ppm | 0.48 | 7.0 | 2.02 | 82.0 | 73 | 80.0 |
| | 0.60 | 9.0 | 0.04 | 99.6 | 17 | 99.5 |
| | 1.100 | 11.7 | <0.01 | >99.9 | 36 | 90.0 |

TABLE V

TREATMENT OF $PCl_3$ PLANT PROCESS WATER WITH $Ca(OH)_2$

| Feed | $Ca(OH)_2$ Treatment | | Treated Filtrate | | | |
|---|---|---|---|---|---|---|
| | $Ca(OH)_2$ Wt.% | pH | Arsenic | | Phosphorus | |
| | | | PPM | % Removal | PPM | % Removal |
| $PCl_3$ Plant | 3.9 | 7.0 | | | | |

TABLE V-continued

TREATMENT OF PCl₃ PLANT PROCESS WATER WITH Ca(OH)₂

| Feed | Ca(OH)₂ Treatment Ca(OH)₂ Wt.% | pH | Treated Filtrate Arsenic PPM | % Removal | Treated Filtrate Phosphorus PPM | % Removal |
|---|---|---|---|---|---|---|
| Process Water (Synthetic) | | | 0.10 | 90 | 17 | 99 |
| As = 1 ppm | 4.0 | 9.0 | 0.11 | 90 | 39 | 98 |
| P = 1900 ppm | | | | | | |
| pH = 1.0 | 4.5 | 11.6 | <0.01 | 99 | 16 | 99 |

TABLE VI

Ca(OH)₂ TREATMENT OF PCl₃ REACTOR WASHOUT AT 0°–5° C.

| | Ca(OH)₂ TREATMENT TO | AGED BEFORE FILTRATION MIN. |
|---|---|---|
| PCl₃ Reactor Washout | pH = 9 at 0°–5° C. | 30 |
| As = 87 ppm | | 90 |
| P = 2756 ppm | | 240 |

| | TREATED FILTRATE ARSENIC ppm | % REMOVED | TREATED FILTRATE PHOSPHORUS ppm | % REMOVED |
|---|---|---|---|---|
| PCl₃ Reactor Washout | 0.045 | 99.9 | 202 | 92.7 |
| As = 87 ppm | 0.022 | 99.9 | 98 | 96.5 |
| P = 2756 ppm | 0.298 | 99.7 | 88 | 96.8 |

TABLE VII

Ca(OH)₂ TREATMENT OF SYNTHETIC PROCESS WATER AT 0–5° C.

| | Ca(OH)₂ TREATMENT TO | AGED BEFORE FILTRATION MIN. |
|---|---|---|
| Process Water | pH = 9 at 0–5° C. | 30 |
| As = 0.95 ppm | | 90 |
| P = 2090 ppm | | 240 |

| | TREATED FILTRATE ARSENIC ppm | % REMOVED | TREATED FILTRATE PHOSPHORUS ppm | % REMOVED |
|---|---|---|---|---|
| Process Water | <0.02 | >98 | 19 | 99.1 |
| As = 0.95 ppm | <0.02 | >98 | 17 | 99.2 |
| P = 2090 ppm | <0.02 | >98 | 20 | 99.0 |

TABLE VIII

TREATMENT OF PCl₃ REACTOR WASHOUT WITH Ca(OH)₂

| Feed | Ca(OH)₂ Treatment Ca(OH)₂, Wt. % | pH | NaOCl Treatment NaOCl, Wt. % |
|---|---|---|---|
| PCl₃ Reactor Washout | 2.80 | 7.0 | None |
| | | | 0.03 |
| As = 59 ppm | 3.00 | 9.0 | None |
| P = 2762 ppm | | | 0.06 |
| pH = 1.0 | | | None |
| | 3.95 | 11.5 | |
| | | | 0.06 |

| Feed | Treated Filtrate Arsenic ppm | % Removal | Treated Filtrate Phosphorus ppm | % Removal |
|---|---|---|---|---|
| PCl₃ Reactor Washout | 3.400 | 94.0 | 159 | 94.0 |
| | 0.310 | 99.5 | 91 | 96.8 |
| As = 59 ppm | 0.300 | 99.5 | 110 | 96.1 |
| P = 2762 ppm | | | | |
| pH = 1.0 | 0.310 | 99.5 | 84 | 97.0 |
| | 0.226 | 99.7 | 138 | 95.0 |
| | 0.020 | 99.9 | 107 | 96.1 |

TABLE IX

TREATMENT OF PCl₃ PLANT PROCESS WATER WITH Ca(OH)₂

| Feed | Ca(OH)₂ Treatment Ca(OH)₂, Wt. % | pH | NaOCl Treatment NaOCl, Wt. % |
|---|---|---|---|
| PCl₃ Plant Process Water (Synthetic) | 3.9 | 7.0 | None |
| | | | 0.42 |
| As = 1 ppm | 4.0 | 9.0 | None |
| P = 1900 ppm | | | 0.42 |
| pH = 1.0 | | | None |
| | 4.5 | 11.6 | |
| | | | 0.42 |

| Feed | Treated Filtrate Arsenic ppm | % Removal | Treated Filtrate Phosphorus ppm | % Removal |
|---|---|---|---|---|
| PCl₃ Plant Process Water (Synthetic) | 0.10 | 90 | 17 | 99.0 |
| | <0.01 | >99 | 39 | 98.0 |
| As = 1 ppm | 0.11 | 90 | 39 | 98.0 |
| P = 1900 ppm | | | | |
| pH = 1.0 | <0.01 | >99 | 1 | 99.9 |
| | <0.01 | >99 | 16 | 99.0 |
| | <0.01 | >99 | 57 | 97.0 |

TABLE X

OZONE ADDED TO Ca(OH)₂ TREATED PROCESS WATER AND PCl₃ REACTOR WASHOUT

| FEED | Ca(OH)₂ TREATMENT TO | AGED BEFORE FILTRATION | OZONE* ADDED AFTER Ca(OH)₂ TREATMENT |
|---|---|---|---|
| PROCESS WATER As = 0.95 ppm | pH = 9 | 4 days | No |
| P = 2090 ppm PCl₃ Reactor Washout | | | Yes |

TABLE X-continued

OZONE ADDED TO Ca(OH)₂ TREATED PROCESS WATER AND PCl₃ REACTOR WASHOUT

| As = 87 ppm | pH = 9 | 4 days | No |
| P = 2756 ppm | | | Yes |

| | TREATED FILTRATE | | | |
|---|---|---|---|---|
| | ARSENIC | | PHOSPHORUS | |
| FEED | ppm | % REMOVED | ppm | % REMOVED |
| PROCESS WATER | | | | |
| As = 0.95 ppm | <0.01 | >99.0 | 3 | 99.9 |
| P = 2090 ppm | <0.01 | >99.0 | 2 | 99.9 |
| PCl₃ Reactor Washout | | | | |
| As = 87 ppm | <0.47 | 99.4 | 71 | 97.5 |
| P = 2756 ppm | <0.35 | 99.6 | 58 | 97.9 |

*Ozone added - bubbling for 2 minutes.

TABLE XI

COMPARISON OF SETTLING AND FILTRATION AS MEANS OF REMOVING SLUDGE AFTER Ca(OH)₂ TREATMENT

FILTRATION

| SAMPLE | POLYELECTROLYTE USE | CAKE VOL. | % H₂O IN CAKE |
|---|---|---|---|
| 28 | None | 69.30 cc | 77.1 |
| 29 | 8 ppm | 7.61 cc | 80.2 |

SETTLING

| SAMPLE | POLYELECTROLYTE USE | SETTLING TIME | SLUDGE VOL. |
|---|---|---|---|
| 30 | None | 2 hrs. | 21 ml |
| 31 | None | 20 hrs. | 19 ml |
| 32 | 8 ppm | 2 hrs. | 32 ml |
| | | 18 hrs. | 28 ml |
| 33 | 8 ppm in liquid portion only | 18 hrs. | 19 ml |

SETTLING AND FILTRATION OF SUPERNATANT

| SAMPLE | POLYELECTROLYTE USE | SOLIDS REMOVED | AS IN FILTRATE |
|---|---|---|---|
| 34 | None | 0.05 g | 0.14 |
| 35 | 8 ppm in liquid portion only | 0.02 g | 0.19 |

FILTRATION

| SAMPLE | FILTRATE ppm, AS | % REMOVAL | ppm P IN FILTRATE | % REMOVAL |
|---|---|---|---|---|
| 28 | 0.19 ppm | 99.82 | 40.5 | 97.65 |
| 29 | 0.15 ppm | 99.85 | 31.4 | 98.18 |

SETTLING

| SAMPLE | ppm, AS IN FILTRATE | % REMOVAL | ppm P IN FILTRATE | % REMOVAL |
|---|---|---|---|---|
| 30 | 0.28 | 99.73 | 27.9 | 98.38 |
| 31 | 0.23 | 99.78 | 37.9 | 97.80 |
| 32 | — | — | — | — |
| | 0.14 | 99.86 | 37.5 | 97.82 |
| 33 | 0.14 | 99.86 | 29.2 | 98.30 |

SETTLING AND FILTRATION AND SUPERNATANT

| SAMPLE | % REMOVAL | ppm P IN FILTRATE | % REMOVAL |
|---|---|---|---|
| 34 | 99.86 | 33.1 | 98.08 |
| 35 | 99.82 | 32.3 | 98.12 |

I claim:

1. A process for treating an aqueous, arsenic-containing medium to effect removal of arsenic therefrom which comprises incorporating in said aqueous medium, in the presence of phosphorus, sufficient Ca(OH)₂ to adjust said aqueous medium to a pH of from about 7.0 to 11.5 to thereby precipitate both arsenic and phosphorus from said aqueous medium, and thereafter separating the precipitate from said aqueous medium.

2. A process as defined in claim 1 wherein Ca(OH)₂ is incorporated into said aqueous medium to adjust the same to a pH of from about 9.0 to 11.5.

3. A process as defined in claim 1 wherein Ca(OH)₂ is incorporated into said aqueous medium to adjust the same to a pH of about 9.0.

4. A process as defined in claim 1 further including incorporating chlorine into said aqueous medium to oxidize arsenic and phosphorus of compounds thereof soluble in said aqueous medium to enhance the precipitation thereof.

5. A process as defined in claim 4 wherein chlorine is incorporated into said aqueous medium by the addition of NaOCl.

6. A process as defined in claim 4 wherein Ca(OH)₂ is incorporated into said aqueous medium to adjust the same to a pH of from about 9.0 to 11.5.

7. A process as defined in claim 4 wherein Ca(OH)₂ is incorporated into said aqueous medium to adjust the same to a pH of about 9.0.

* * * * *

UNITED STATES PATENT AND TRADEMARK OFFICE
CERTIFICATE OF CORRECTION

PATENT NO. : 4,201,667
DATED : 6 May 1980
INVENTOR(S) : Hsiang P. Liao

It is certified that error appears in the above—identified patent and that said Letters Patent is hereby corrected as shown below:

Column 2, line 22, "and" should read --of--; line 34, "3OH$^-$" should read --3OH$^-$--; line 35, "6OH$^-$" should read --6OH$^-$--; line 43, "6OH$^-$" should read --6OH$^-$--; and line 50, "4OH$^-$" should read --4OH$^-$--. Column 3, line 3, "synthtic" should read --synthetic-- line 12, --and-- is inserted after "arsenic"; and line 68, "ater" should read --water--. Column 4, line 1, --of-- is inserted after "removal"; line 13, "323 ppm" should read --354 ppm-- line 16, --arsenic-- is inserted after "1 ppm" line 18, "11.5" should re --11.6-- and line 59, "Ca(OH)hd 2" shou read --Ca(OH)$_2$--. Column 5, line 11, "TABLE XII" should read --TABLE XI--. Column 6, in TABLE III, in the "pH" column, "8.0" should read --9.0--

Signed and Sealed this

Twelfth Day of August 1980

[SEAL]

Attest:

SIDNEY A. DIAMOND

Attesting Officer  Commissioner of Patents and Trademar